(12) United States Patent
Beck et al.

(10) Patent No.: US 7,254,547 B1
(45) Date of Patent: Aug. 7, 2007

(54) DYNAMICALLY TARGETING ONLINE ADVERTISING MESSAGES TO USERS

(75) Inventors: Steve Beck, Bothell, WA (US); Scott Eric Lipsky, Seattle, WA (US); Vladimir Victorovich Schipunov, Seattle, WA (US)

(73) Assignee: aQuantive, Inc., Seattle, WA (US)

( * ) Notice: Subject to any disclaimer, the term of this patent is extended or adjusted under 35 U.S.C. 154(b) by 1231 days.

(21) Appl. No.: 09/721,441

(22) Filed: Nov. 22, 2000

Related U.S. Application Data

(60) Provisional application No. 60/166,949, filed on Nov. 22, 1999.

(51) Int. Cl.
*G06Q 30/00* (2006.01)
(52) U.S. Cl. ...................................................... 705/14
(58) Field of Classification Search .................... 705/1, 705/14
See application file for complete search history.

(56) References Cited

U.S. PATENT DOCUMENTS

| | | | | |
|---|---|---|---|---|
| 5,724,521 A | * | 3/1998 | Dedrick ....................... 395/226 |
| 5,848,396 A | * | 12/1998 | Gerace .......................... 705/10 |
| 6,134,532 A | * | 10/2000 | Lazarus et al. ............... 705/14 |
| 6,286,005 B1 | * | 9/2001 | Cannon ....................... 707/100 |
| 6,470,079 B1 | * | 10/2002 | Benson ................... 379/114.13 |
| 6,654,725 B1 | * | 11/2003 | Langheinrich et al. ........ 705/14 |

FOREIGN PATENT DOCUMENTS

JP 2000056720 A * 2/2000

OTHER PUBLICATIONS

Cheng, Kipp, "Engage technology plays follow the user", Oct. 11, 1999, Brandweek, v40n38, pp. 34.*

* cited by examiner

*Primary Examiner*—Jeffrey D. Carlson
(74) *Attorney, Agent, or Firm*—Perkins Coie LLP

(57) ABSTRACT

A facility for providing targeted advertising messages is described. The facility receives advertising requests each identifying a user. For each received advertising request, the facility applies a sequence of conditions to information relating to the identified user. The facility replies to each advertising request with an advertising message associated with the first condition in the applied sequence that is satisfied.

6 Claims, 5 Drawing Sheets

DYNAMICALLY TARGETING ONLINE ADVERTISING MESSAGES TO USERS

CROSS-REFERENCE TO RELATED APPLICATION

This application claims the benefit of U.S. Provisional Application No. 60/166,949 filed Nov. 22, 1999, which is hereby incorporated by reference.

TECHNICAL FIELD

The present invention is directed to Internet advertising techniques.

BACKGROUND

As computer use, and particularly the use of the World Wide Web, becomes more and more prevalent, the volumes of Internet advertising presented grow larger and larger. While online advertising messages are in some cases quite effective, their overall level of effectiveness is limited by the arbitrariness with which specific advertising messages are selected for presentation to particular users—in general, advertising messages are presented to users without regard for their identities or other information available about them.

Additionally, conventional online advertising techniques fail to use effective testing and control methodologies to evaluate the effectiveness of presented advertising messages.

Accordingly, a facility for analyzing the effectiveness of online advertising and dynamically targeting online advertising messages to users would have significant utility.

DETAILED DESCRIPTION

Figure 1:
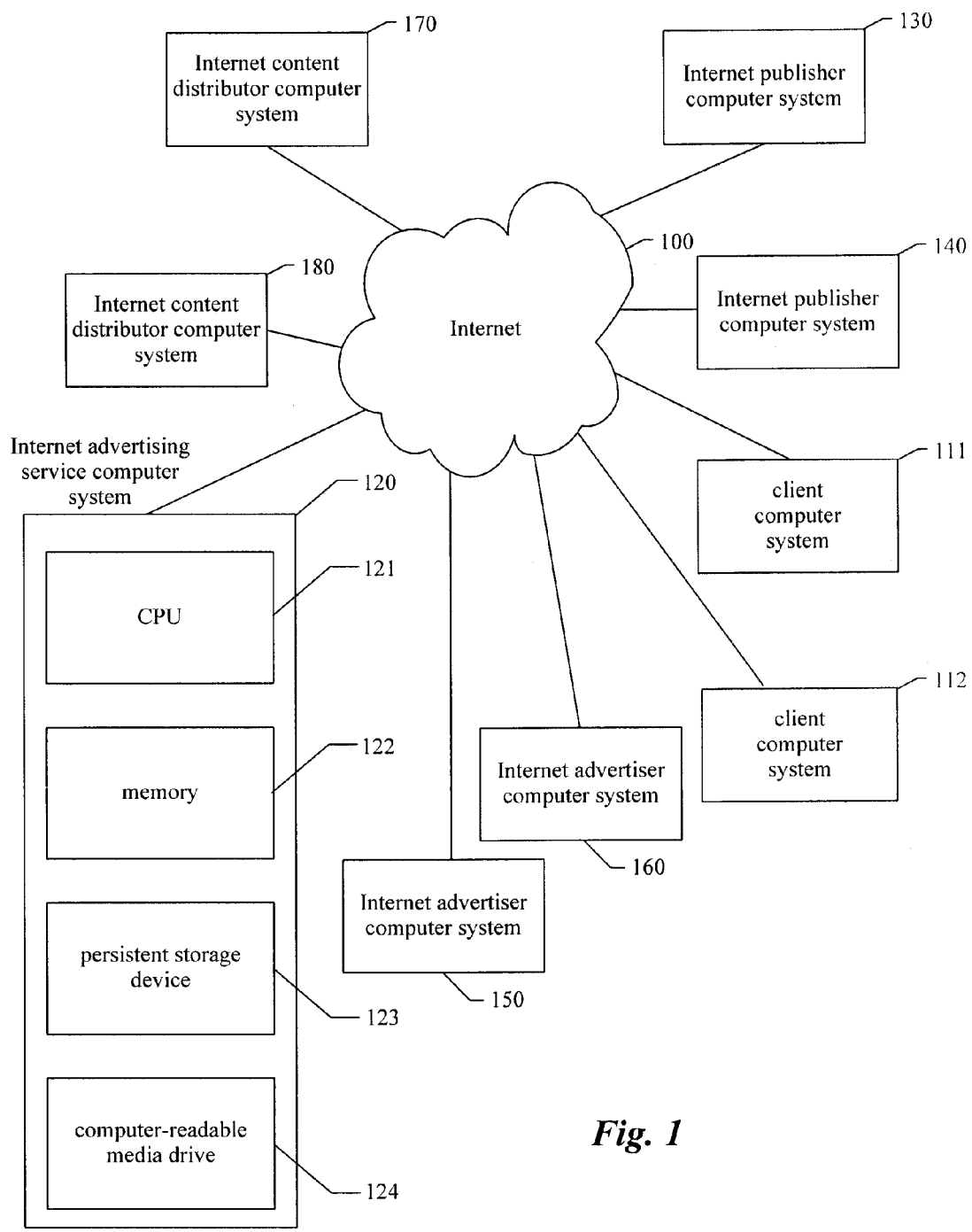
FIG. 1 is a high-level block diagram showing the environment in which the facility preferably operates.

A software facility for analyzing the effectiveness of online advertising and dynamically targeting online advertising messages to users based on the results of the analysis is provided. The facility assigns user identifiers, called "cookies," to users that are to participate in the analysis. The facility divides these cookies into test groups, each of which is subjected to a different sequence of conditions. A percentage of the cookie population is specified for each test group. When an advertising request is received from a user identified by the user's cookie, the facility determines which test group the cookie is in, and evaluates the condition sequence for that test group in order to select an advertising message to send to the user in response to the advertising request.

Associated with each condition is a treatment, such as a single advertising message to serve, or a group of advertising messages from which to serve one advertising message. Some conditions can have multiple treatments—in this case, the test group for the column is subdivided into treatment subgroups each corresponding to one of the treatments. A percentage of the testing group population is specified for each of the treatment subgroups to receive the corresponding treatment when those cookies satisfy the associated condition. A condition, its treatment subgroups, and their treatments are known as a "segment." The set of the treatment subgroups that a particular user is in, together with the test group that the cookie is in, is known as that user's "cookie migration path." The number of different cookie migration paths in a single test group is the product of the number of treatment subgroups for each segment.

When an advertising message request is received from a user, the facility uses the user's cookie to select the test group of which the user is a member. The conditions of the condition sequence for the selected test group are then evaluated for the user, in order, to identify the first condition in the sequence that is satisfied. If no conditions in the sequence are satisfied, the facility identifies a default condition. If the identified condition has a single treatment, it is used to serve an advertising message to the user. If the identified condition has a multiple treatments, the user's cookie is used to select the treatment subgroup of which the user is a member, and the treatment for the selected treatment subgroup is used to serve an advertising message to the user. Effectiveness data for a particular served advertising message—such as conversion/no conversion, transaction value, etc.—is stored in conjunction with the cookie migration e user to whom it was served. Effectiveness data stored in this manner can be analyzed, or "rolled up," in a variety of ways, including aggregating the data for cookie migration paths containing each of the treatments in a particular segment.

The facility integrates a variety of variables when making its advertising message presentation decision. These variables include click-stream data indicating the sequence of links that the user has traversed, and client transaction data indicating transactions that the user has entered into, such as purchase transactions; real-time data indicating current actions of the user, such as the current page being viewed by the user, and historical data indicating past actions of the user, such as web pages visited by the user, and advertising messages presented to the user; and user data pertaining specifically to the user and global data pertaining to larger groups of users, or that is user-independent, such as the current time and other variables relating to the current time. The integration of these different types of data is a departure from conventional customer targeting techniques.

The facility performs randomization and controlled testing. The facility randomizes the universe of cookies into different test groups. Those assignments are maintained for as long as desired, ensuring independence of test group assignment across all clients. Even cookies that have not been profiled—that is, those for which the facility has no historical data—are randomized the first time they are seen. This aspect of the facility differs from conventional online advertising techniques which are typically unable to discern all of the advertising messages in a campaign seen by a particular viewer.

Traditional direct marketing techniques require up-front segmentation of users. Marketers typically mail certain messages to the various segments, evaluate the results, and then re-segment. The facility is more dynamic. It may have the opportunity to message to the same user on behalf of an advertiser several times. By taking into account recent behavior into an advertising message decision, the facility makes an informed choice. The facility updates users' segmentation throughout campaigns. However, when evaluating the most effective advertising message within a segment it is important that the populations receiving each treatment (advertising message) are identical in their treatment while they were in other segments as well. The populations receiving treatments within one segment are equally filled with all the possible combinations of historical handling.

Because a user's segmentation changes throughout a campaign, the advertising messages seen while in previous segments affect the performance metrics of advertising messages seen while in the current segment. By attributing conversions and other effectiveness measures to groups of cookies having the same cookie migration path and seeing the same advertising messages under the same conditions rather than attributing effectiveness measures to particular advertising messages, the facility takes into account the variance caused by messages in other segments into account while evaluating messages within a segment in an unbiased and low variance manner.

FIG. 1 is a high-level block diagram showing the environment in which the facility preferably operates. The diagram shows a number of client computer systems 111-112. An Internet user preferably uses one such client computer system to connect, via the Internet 100, to an Internet publisher computer system, such as Internet publisher computer systems 130 and 140, to retrieve and display a Web page.

In cases where an Internet advertiser, through the Internet advertising service, has purchased advertising space on the Web page provided to the Internet user computer system by the Internet publisher computer system, the Web page contains a reference to a URL in the domain of the Internet advertising service computer system 120. When a user computer system receives a Web page that contains such a reference, the Internet user computer systems sends a request to the Internet advertising service computer system to return data comprising an advertising message, such as a banner advertising message. When the Internet advertising service computer system receives such a request, it selects an advertising message to transmit to the Internet user computer system in response the request, and either itself transmits the selected advertising message or redirects the request containing an identification of the selected advertising message to an Internet content distributor computer system, such as Internet content distributor computer systems 170 and 180. When the Internet user computer system receives the selected advertising message, the Internet user computer system displays it within the Web page.

The displayed advertising message preferably includes one or more links to Web pages of the Internet advertiser's Web site. When the Internet user selects one of these links in the advertising message, the Internet user computer system dereferences the link to retrieve the Web page from the appropriate Internet advertiser computer system, such as Internet advertiser computer system 150 or 160. In visiting the Internet advertiser's Web site, the Internet user may traverse several pages, and may take such actions as purchasing an item or bidding in an auction. Revenue from such actions typically finances, and is often the motivation for, the Internet advertiser's Internet advertising.

The Internet advertising service computer system 120 preferably includes one or more central processing units (CPUs) 121 for executing computer programs such as the facility; a computer memory 122 for storing programs and data; a persistent storage device 123; and a computer-readable media drive 124, such as a CD-ROM drive, for reading programs and data stored on a computer-readable medium.

While preferred embodiments are described in terms of the environment described above, those skilled in the art will appreciate that the facility may be implemented in a variety of other environments, including a single, monolithic computer system, as well as various other combinations of computer systems or similar devices.

To more fully illustrate its implementation and operation, the facility is described in conjunction with several examples. FIGS. 2-5 are targeting diagrams showing targeting examples.

Figure 2:
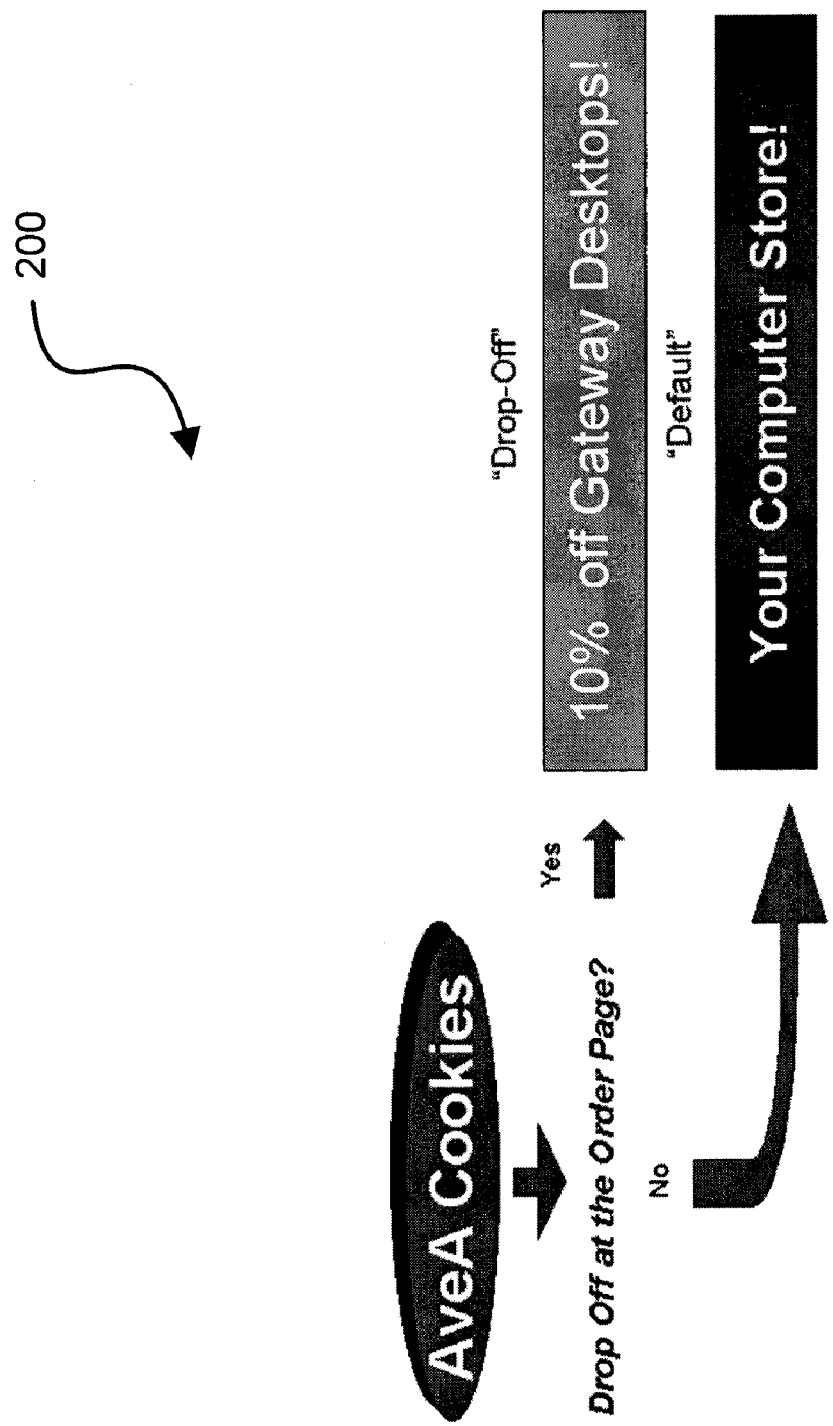
FIG. 2 is a targeting diagram showing a targeting program that utilizes one test group, one segment, and one treatment.

FIG. 2 is a targeting diagram showing a targeting program that utilizes one test group, one segment, and one treatment. Because this targeting program includes just one test group, all cookies flow from the cookie source to column 220 representing the condition sequence for the single test group. The cookies are each subjected to the condition "Drop Off at the Order Page?" That is, the facility determines from profile data whether the user associated with the current cookie visited an order page of a web merchant web site, but then failed to continue in the ordering process by advancing to the next page in the ordering process. Those cookies that satisfy this condition proceed to the "Drop-Off" segment, where they are presented with advertising message 231 that is appropriate for users in this segment. Because this condition is the last condition in the condition sequence, those cookies that do not satisfy this condition proceed to the default segment, where they are presented with advertising message 241. While FIG. 3 shows each advertising treatment as a banner advertisement, the facility may employ advertising treatments and messages of various different types, also including audio advertising messages, paper-based advertising messages, video advertising messages, and computer programs or similar agents for delivering advertising messages.

Figure 3:
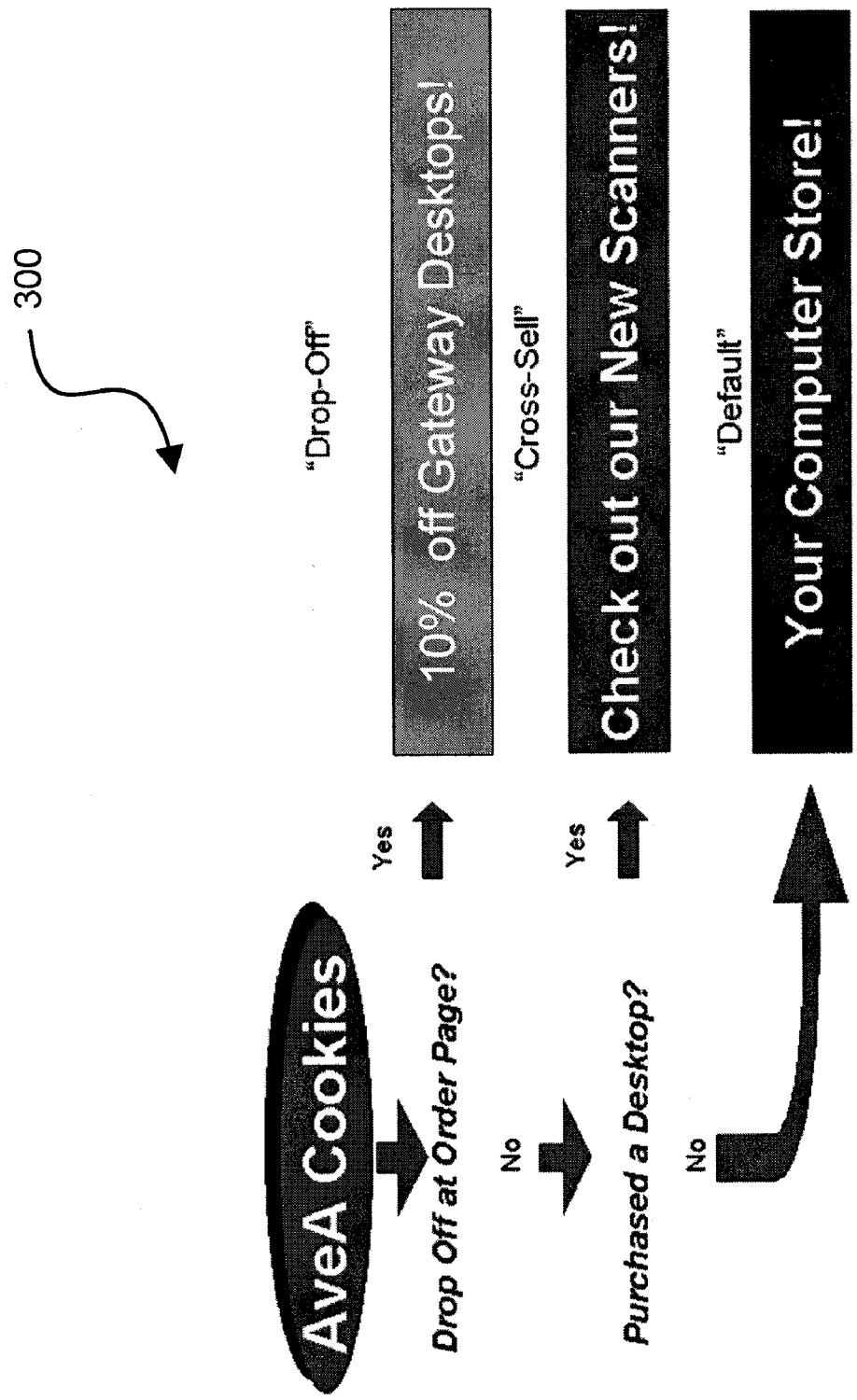
FIG. 3 is a targeting diagram showing a targeting program for one test group, two segments, and one treatment.

FIG. 3 is a targeting diagram showing a targeting program for one test group, two segments, and one treatment. All the cookies are directed to column 320, representing the only test group. Those cookies that satisfy condition 330 are part of the "Drop-Off" segment, and are presented with advertising message 231. Those cookies that do not satisfy condition 330 but satisfy condition 340 are part of the "Cross-Sell" segment, and are presented with advertising message 341. Those cookies that satisfy neither condition are part of a default segment, and are presented with advertising message 351.

Figure 4:
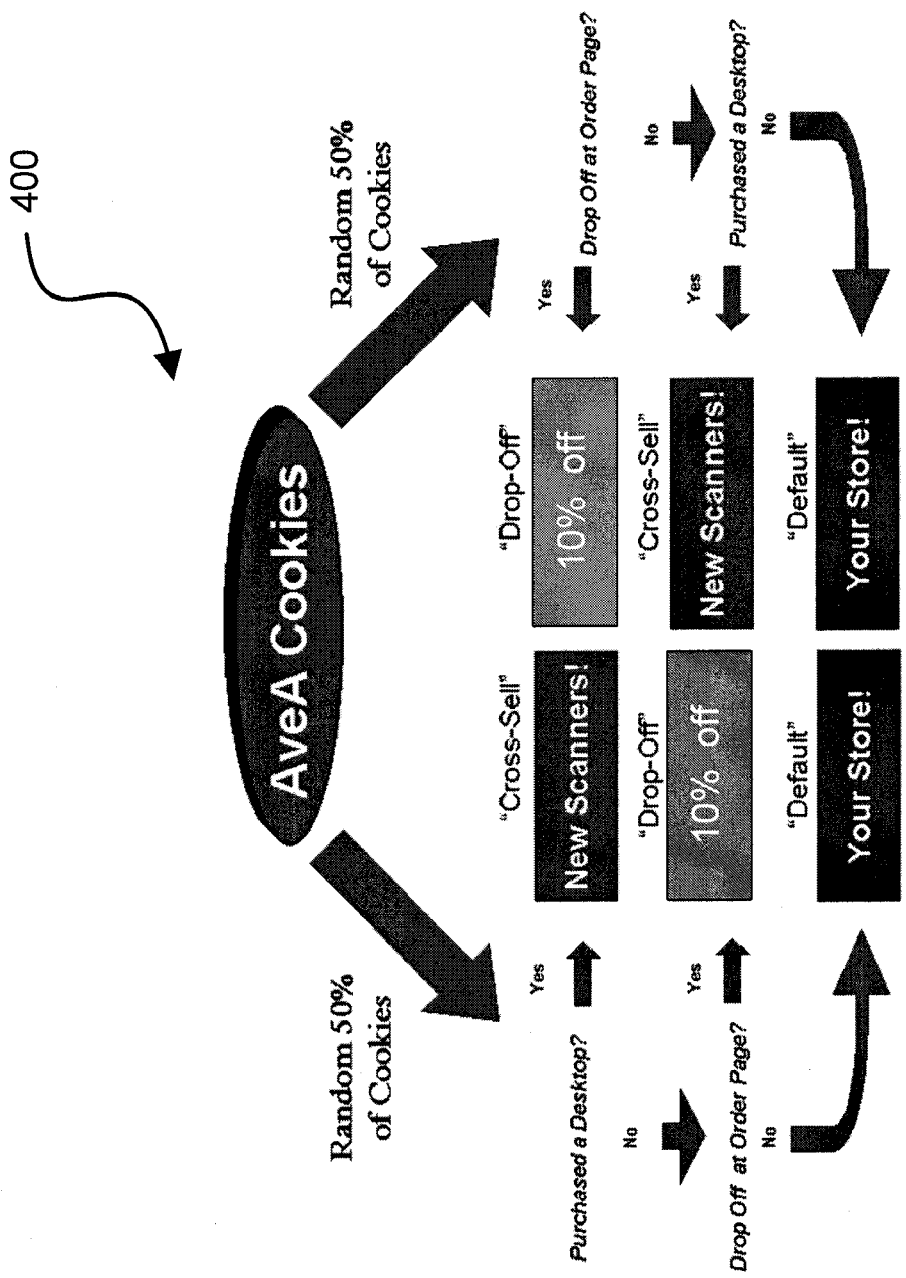
FIG. 4 is a targeting diagram showing a targeting program having two test groups, two segments, and one treatment.

FIG. 4 is a targeting diagram showing a targeting program having two test groups, two segments, and one treatment. The targeting program has two test groups, represented by columns 421 and 422. Fifty percent of the cookies flow from the cookie source to the test group represented by column 421, and the other fifty percent of the cookies flow to the test group represented by column 422. In column 421, all cookies in the first test group are subjected to condition 430. Those that satisfy it are in the "Cross-Sell" segment and are presented with advertising message 431, while those that do not satisfy condition 430 proceed to condition 440. Those cookies that satisfy condition 440 are part of the "Drop-Off" segment, and are presented advertising message 441. Those cookies in the first test group that fail both conditions 430 and 440 are in the default segment, and are presented with advertising message 471. Cookies among the second test group are subjected to the conditions 450 and 460 in column 422 in the order shown, and are segmented based upon those conditions.

While the number of segments for each test group in the program shown in FIG. 4 are the same, each test group may have any number of segments and associated conditions. Likewise, segments used for one test group need not be used for other test groups. Further, where the same segment is used for more than one test group, a different advertising message may be presented to cookies that fall into that segment in the first test group than is presented to cookies that fall into that segment in the second test group.

Figure 5:
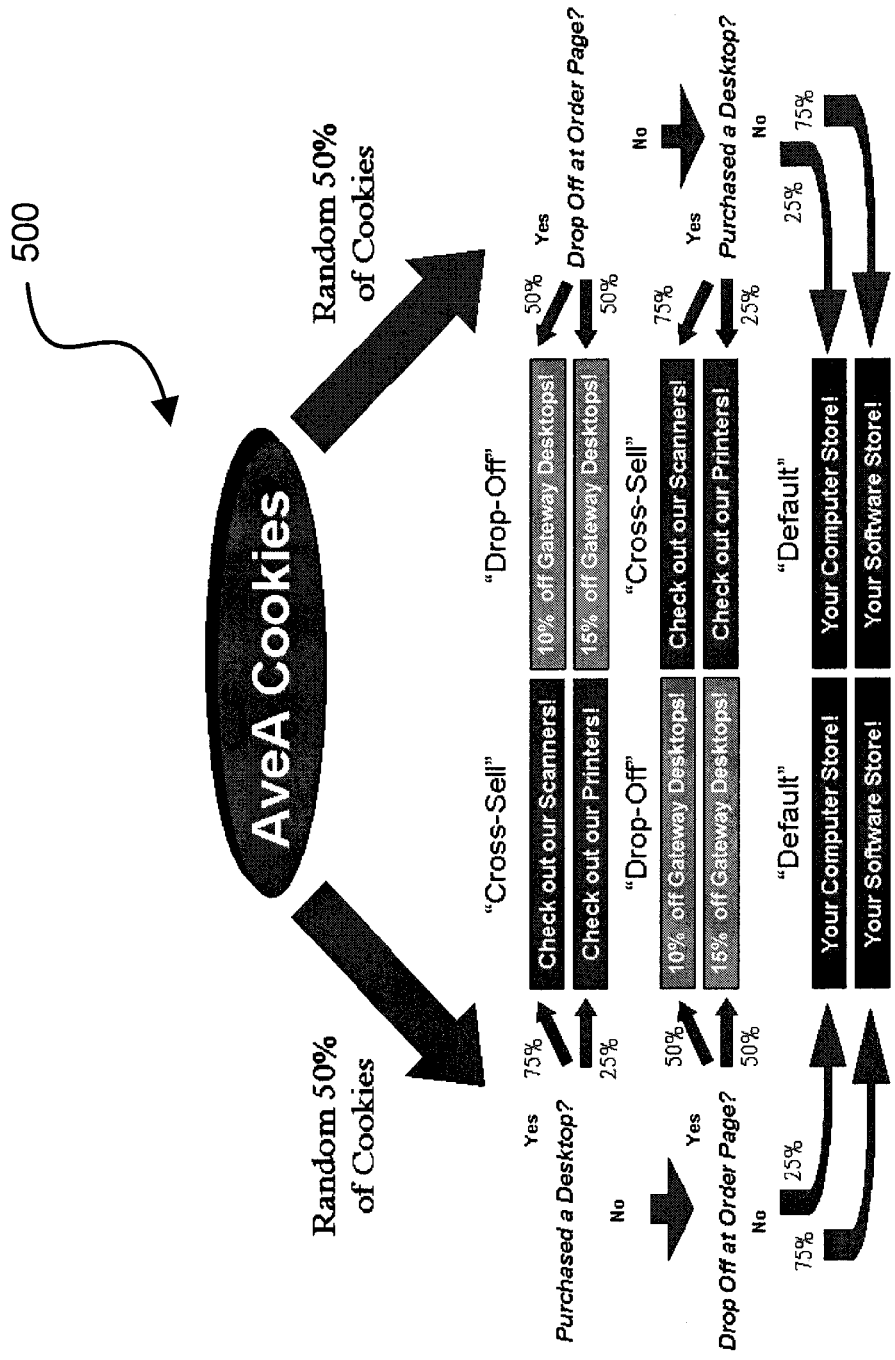
FIG. 5 is a targeting diagram for a targeting program having two test groups, two segments, and two treatments.

FIG. 5 is a targeting diagram for a targeting program having two test groups, two segments, and two treatments. This testing program is similar to the one shown in FIG. 4, except that it provides multiple treatments for each segment. This is illustrated by the "Cross-Sell" segment for the first test group. Cookies in the first test group that are directed to column 521 and satisfy test 530 are split into two groups, called treatment subgroups. A first treatment subgroup of cookies, constituting 75% of the cookies in test group 1, are subjected to a first treatment and presented with advertising message 531. A second treatment subgroup of these cookies constituting 25% of the cookies in the first test group are subjected to a second treatment, and presented with advertising message 532. Other segments for both test groups are each similarly split into two treatments. While the number of treatments shown for each segment in FIG. 5 is the same, each segment may have any number of treatments.

In the example shown in FIG. 5 (having two segments, two test groups, and two treatments), there are really 16 unique random populations, shown below in Table 1.

TABLE 1

| | Test Group | Segment 1 Treatment | Segment 2 Treatment | Segment 3 Treatment | Fraction of Whole |
|---|---|---|---|---|---|
| 1 | 1 | Scanners | 10% off | Computer Store | 0.046875 |
| 2 | 1 | Scanners | 10% off | Software Store | 0.140625 |
| 3 | 1 | Scanners | 15% off | Computer Store | 0.046875 |
| 4 | 1 | Scanners | 15% off | Software Store | 0.140625 |
| 5 | 1 | Printers | 10% off | Computer Store | 0.015625 |
| 6 | 1 | Printers | 10% off | Software Store | 0.046875 |
| 7 | 1 | Printers | 15% off | Computer Store | 0.015625 |
| 8 | 1 | Printers | 15% off | Software Store | 0.046875 |
| 9 | 2 | 10% off | Scanners | Computer Store | 0 046875 |
| 10 | 2 | 10% off | Scanners | Software Store | 0.140625 |
| 11 | 2 | 10% off | Printers | Computer Store | 0.015625 |
| 12 | 2 | 10% off | Printers | Software Store | 0 046875 |
| 13 | 2 | 15% off | Scanners | Computer Store | 0.046875 |
| 14 | 2 | 15% off | Scanners | Software Store | 0 140625 |
| 15 | 2 | 15% off | Printers | Computer Store | 0.015625 |
| 16 | 2 | 15% off | Printers | Software Store | 0.046875 |

To measure which strategy, i.e., which column of the targeting program, performed best, we aggregate all the data for each test group. For the first test group, this means combining the data from rows 1-8 in the above table. The main metrics for the test groups in the example are shown below in Table 2.

TABLE 2

| Name | Impressions | Clicks | Purchases | Registrations |
|---|---|---|---|---|
| Test Group 1 | 102079 | 612 | 87 | 148 |
| Test Group 2 | 103444 | 517 | 72 | 133 |

The facility need not attribute a purchase or registration to a single advertising message. Since cookies can only be assigned to one test group, the facility attributes credits for the conversion to the test group. This facilitates accurate comparison of the different strategies without having to rely on an arbitrary algorithm to assign an action to a specific advertising message.

For treatment comparison, the facility uses a similar framework. To start, the facility aggregates all of the results for users that were assigned to a certain treatment within a segment. For example, to measure the performance of the "10% banner" in the second segment of the first test group, the facility begins by combining all the unique populations that have the "10% banner" assigned. Rows 1, 2, 5, and 6 in Table 1 above are therefore combined. However, for treatment comparison, the facility need not include all the users from rows 1, 2, 5, and 6. We include only those users that saw at least one advertising message while in that segment. It is clear that the actions of users that have not seen an advertising message in that segment—because either they were never in the segment or were not shown an advertising message while in it—cannot be due to what treatment they were assigned to, so they are excluded. Therefore, the number of impressions used in our metrics for a subgroup is always between the "group impressions" (advertising messages shown to users while they are in that segment) and the total impressions received by all cookies that have been assigned to that treatment. Using the percentages from the example shown in FIG. 5, the treatment comparison metrics are shown below in Table 3.

TABLE 3

| Type | Test Group | Segment Name | Treatment | Impressions | Group Impressions | Clicks | Group Clicks | Purchases | Registrations |
|---|---|---|---|---|---|---|---|---|---|
| Subgroup | Test Group 1 | Cross-sell | Scanners | 9974 | 7672 | 60 | 46 | 11 | 16 |
| Subgroup | Test Group 1 | Cross-sell | Printers | 3297 | 2536 | 20 | 15 | 3 | 5 |
| Subgroup | Test Group 1 | Drop-off | 10% off | 12634 | 10107 | 76 | 61 | 11 | 18 |
| Subgroup | Test Group 1 | Drop-off | 15% off | 12886 | 10309 | 77 | 62 | 13 | 21 |
| Subgroup | Test Group 1 | Default | Computer Store | 21697 | 18081 | 130 | 108 | 20 | 33 |
| Subgroup | Test Group 1 | Default | Software Store | 68319 | 53374 | 410 | 320 | 58 | 99 |
| Subgroup | Test Group 2 | Drop-off | 10% off | 14468 | 11859 | 72 | 59 | 10 | 19 |
| Subgroup | Test Group 2 | Drop-off | 15% off | 14439 | 11933 | 72 | 60 | 11 | 20 |
| Subgroup | Test Group 2 | Cross-sell | Scanners | 7227 | 5434 | 36 | 27 | 6 | 10 |
| Subgroup | Test Group 2 | Cross-sell | Printers | 2331 | 1807 | 12 | 9 | 2 | 3 |
| Subgroup | Test Group 2 | Default | Computer Store | 20728 | 18024 | 104 | 90 | 14 | 27 |
| Subgroup | Test Group 2 | Default | Software Store | 64177 | 54387 | 321 | 272 | 46 | 84 |

In Table 3, the column headings mean the following:

Treatment: the advertising message or rotation of advertising messages we are testing.

Impressions: the total impressions viewed by users who saw at least one advertising message while in the subgroup.

Group impressions: the total impressions shown to users while in that subgroup.

Clicks: the total clicks from users who viewed at least one advertising to message while in that subgroup.

Group clicks: the total clicks from users while in the subgroup.

Purchases: the totals purchases from users who saw at least one advertising message in the subgroup before purchasing.

Registrations: the total registrations from users who saw at least one advertising message in the subgroup before purchasing.

Table 3 can be viewed in conjunction with Table 2 showing test group performance. For example, in Table 3, the sum of the "group clicks" column for Test group #1—612—equals the total clicks for Test group #1 in Table 2.

The sum of all of the registrations for the subgroups in test group one and two are higher than the registrations reported in the test group comparison table. This is also true with the sum of the clicks and purchases for both test groups. This is because some users will change segments during the campaign. If a user purchases after seeing advertising messages from multiple segments, multiple treatments will be given credit. Impressions, clicks, purchases, and registrations are counted using this same algorithm. "Group impressions" and "group clicks" are included only for informational purchases. The sum of these columns will add up to the test group totals, since they only include the impressions and clicks from users while in that segment.

The metrics produced in this manner by the facility are unbiased. They measure cumulative advertising message effect without relying on arbitrary algorithms to give credit for an action to one advertising message. In addition, they are low-variance because only impressions that may have contributed to these events are included, enabling the facility to ignore data that is merely adding noise.

While embodiments of the facility described above select advertising messages that are provided via the World Wide Web to users of general-purpose computer systems executing Web browsers, additional embodiments of the facility may be used with other communication channels and/or other types of devices. In particular, the facility may preferably be used in connection with advertising messages delivered to such special-purpose devices as personal digital assistants, cellular and satellite phones, pagers, devices installed in automobiles and other vehicles, automatic teller machines, televisions, and other home appliances.

It will be understood by those skilled in the art that the above-described facility could be adapted or extended in various ways. For example, the facility may utilize target targeting programs that are organized differently, and those that incorporate more levels of logic, or logic of various different types. The results of the targeting performed by the facility may be analyzed in a variety of ways other than those described above. While the foregoing description makes reference to preferred embodiments, the scope of the invention is defined solely by the claims that follow and the elements recited therein.

The invention claimed is:

1. One or more computer memories collectively containing an advertising targeting data structure, comprising a plurality of entries, each entry corresponding to a user and containing:

information identifying a test group to which the user belongs, the identified test group having been selected for the user without regard for user profile information, the identified test group indicating which of a plurality of sequences of conditions will be applied when an advertising request originating with the user is received; and for each of the conditions of the indicated sequence of conditions, information identifying a treatment subgroup to which the user belongs, the identified treatment subgroup having been selected for the user without regard for user profile information, the identified treatment subgroup indicating which of a plurality of advertising treatments will be applied when the condition is the first condition in the sequence of conditions to be satisfied.

2. A method in a computing system for evaluating alternative advertising strategies, comprising:

for each of a plurality of users:
in the computing system, randomly selecting one of a plurality of different sequences of conditions to apply to the user when an advertising request is received for the user, and
in the computing system, for at least one of the conditions in the condition sequence selected for the user, randomly selecting one of a plurality of different advertising messages associated with the condition to present to the user when the condition is the first condition of the sequence that is satisfied by profile information for the user; and each time an advertising request is received for one of the plurality of users:
in the computing system, applying to the user the condition sequence that was randomly selected for the user to identify the first condition of the sequence that is satisfied by profile information for the user, and
in the computing system, presenting the user the advertising message associated with the identified condition that was randomly selected for the user.

3. The method of claim 2, further comprising:

in the computing system, generating an assessment of the effectiveness of the advertising messages presented to each user;

in the computing system, for each of the plurality of condition sequences, aggregating the effectiveness assessments of the users for whom the condition sequence was selected;

in the computing system, selecting as the most effective of the plurality of condition sequences the condition sequence having the highest aggregated effectiveness assessment;

in the computing system, for each of the plurality of advertising message, aggregating the effectiveness assessments of the users for whom the advertising message was selected; and in the computing system, selecting as the most effective of the plurality of advertising messages the advertising message having the highest aggregated effectiveness assessment.-

4. A method in a computing system for evaluating alternative advertising strategies, comprising:
- in the computing system, receiving an advertising request for a user during the duration of an advertising campaign, the received request containing an identifier uniquely identifying the user;
- if the user has not been added to an advertising test group and advertising test subgroup for the campaign:
  - in the computing system, without reference to any profile information for the user, selecting an advertising test group among a plurality of advertising test groups, each advertising test group of the plurality corresponding to a different sequence of conditions,
  - in the computing system, assigning the user to the selected advertising test group using the identifier contained in the received request,
  - in the computing system, without reference to any profile information for the user, selecting one advertising test subgroup among a plurality of advertising test subgroups that are associated with the advertising test group to which the user is assigned, each advertising test subgroup of the plurality corresponding to a different set of advertising messages to be presented in response to the application of the sequence of conditions corresponding to the advertising test group to which the user is assigned, and
  - in the computing system, assigning the user to the selected advertising test subgroup using the identifier contained in the received request;
- in the computing system, applying to profile information for the user the sequence of conditions corresponding to the advertising test group to which the user is assigned to identify the first condition of the sequence that is satisfied; and
- in the computing system, presenting to the user an advertising message associated with the identified condition that is among the set of advertising messages corresponding to the advertising test subgroup to which the user is assigned.

5. The method of claim 4, wherein the acts of claim 4 are performed for a plurality of advertising requests received for a plurality of users, the method further comprising:
- in the computing system, generating an assessment of the effectiveness of the advertising messages presented to each user;
- in the computing system, for each of the plurality of condition sequences, aggregating the effectiveness assessments of the users for whom the condition sequence was selected;
- in the computing system, selecting as the most effective of the plurality of condition sequences the condition sequence having the highest aggregated effectiveness assessment;
- in the computing system, for each of the plurality of advertising message, aggregating the effectiveness assessments of the users for whom the advertising message was selected; and
- in the computing system, selecting as the most effective of the plurality of advertising messages the advertising message having the highest aggregated effectiveness assessment.

6. The method of claim 4 wherein the selecting acts are performed by, in the computing system, selecting an advertising test group and an advertising test subgroup that tend to conform the relative sizes of the advertising test groups and advertising test subgroups to predetermined relative sizes for the advertising test group sand advertising test subgroups.

* * * * *